(12) United States Patent
Eisenman et al.

(10) Patent No.: US 7,597,191 B2
(45) Date of Patent: Oct. 6, 2009

(54) BULK MATERIAL BED WITH IMPROVED CONVEYOR

(75) Inventors: Peter L. Eisenman, Boise, ID (US); James C. Miller, Boise, ID (US); Ren Barry Bai, Boise, ID (US)

(73) Assignee: Trinity Trailer Mfg., Inc., Boise, ID (US)

( * ) Notice: Subject to any disclaimer, the term of this patent is extended or adjusted under 35 U.S.C. 154(b) by 588 days.

(21) Appl. No.: 11/417,583

(22) Filed: May 2, 2006

(65) Prior Publication Data

US 2007/0264113 A1   Nov. 15, 2007

(51) Int. Cl.
*B65G 15/10* (2006.01)
(52) U.S. Cl. .......................... 198/817; 198/728
(58) Field of Classification Search .................. 198/529, 198/550.01, 728, 817; 414/527, 528
See application file for complete search history.

(56) References Cited

U.S. PATENT DOCUMENTS

| | | | |
|---|---|---|---|
| 749,695 A | 1/1904 | Litchfield | |
| 2,496,463 A | 2/1950 | Gaddis | 214/83.36 |
| 4,055,265 A | 10/1977 | Eisenman | 214/17 D |
| 4,230,360 A | 10/1980 | Eisenman | 296/181 |
| 4,664,583 A | 5/1987 | Gust | 414/528 |
| 4,741,431 A | 5/1988 | Whitehead | 198/844 |
| 4,897,183 A * | 1/1990 | Lewis, Jr. et al. | 209/235 |
| 5,102,285 A | 4/1992 | Gust | 414/528 |
| 6,085,948 A * | 7/2000 | Putze | 222/561 |
| 6,220,810 B1 * | 4/2001 | Wilkerson | 414/528 |
| 6,623,234 B1 | 9/2003 | Herring et al. | 414/528 |
| 7,172,064 B2 * | 2/2007 | Alversson | 198/817 |
| 7,293,640 B1 * | 11/2007 | Aulick et al. | 198/817 |
| 7,428,964 B2 * | 9/2008 | Yoshida | 198/850 |
| 7,473,168 B2 * | 1/2009 | Day et al. | 460/16 |

OTHER PUBLICATIONS

Advertising sheet for "Domex 110 XF" by SSAB Swedish Steel. Date: prior to April 2006.

* cited by examiner

*Primary Examiner*—Douglas A Hess
(74) *Attorney, Agent, or Firm*—Pedersen & Co., PLLC; Ken J. Pedersen; Barbara S. Pedersen

(57) ABSTRACT

A self-unloading bed includes a conveyor with chain bars that are strong, light-weight and non-damaging to the floor upon which the conveyor slides. The preferred chain bar is an elongated bar with two legs, each of said two legs having a foot. The feet extend away from the leading (unloading) direction, the transition from leg to foot being formed by smooth bends, so that no sharp edges exist that would gouge into the floor as the chain bar moves across the floor. The preferred chain bar, made of a single metal bar with four longitudinal bends, is extremely strong for its weight, and it unlikely to bend or gouge into the floor during use.

10 Claims, 7 Drawing Sheets

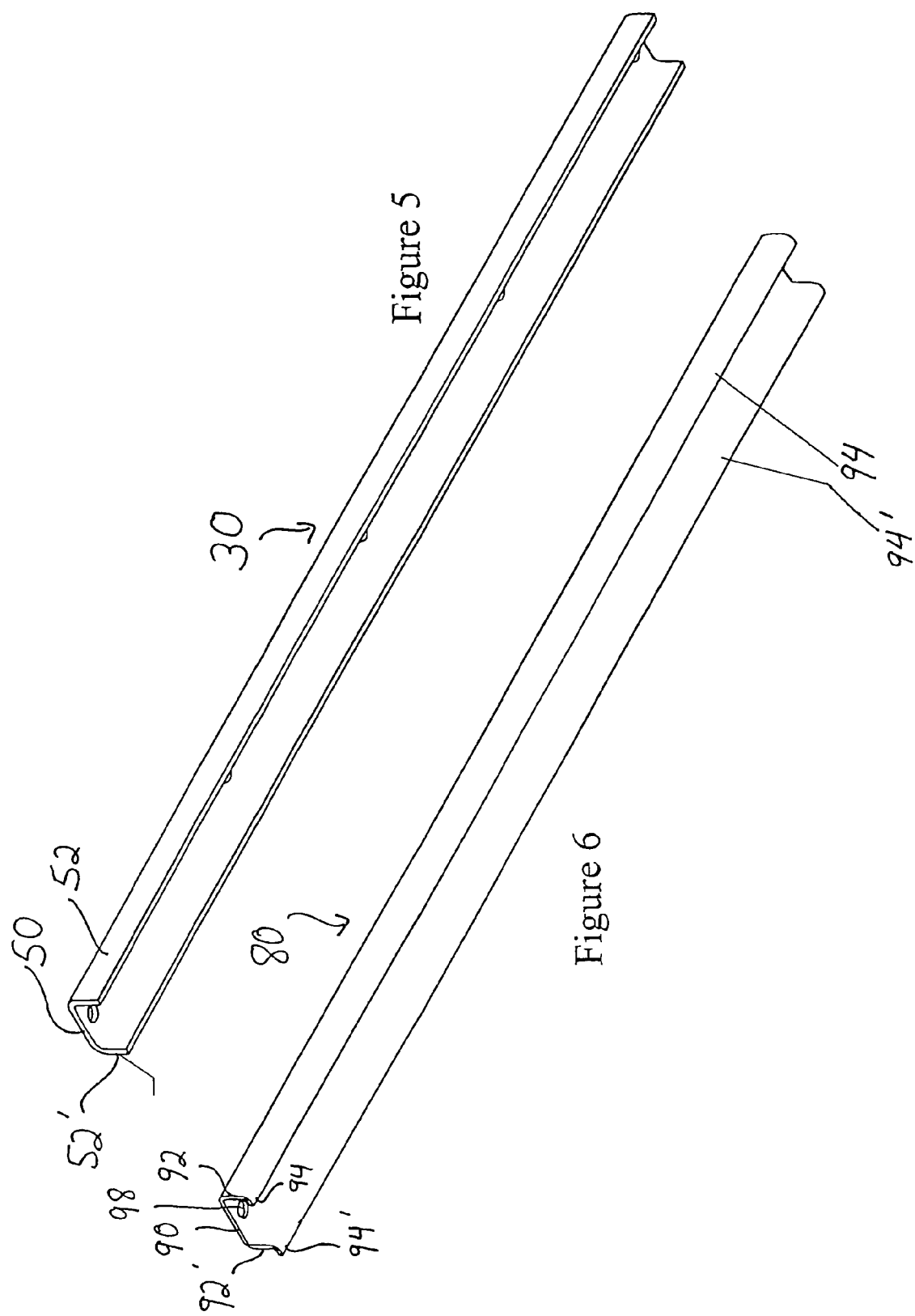

BULK MATERIAL BED WITH IMPROVED CONVEYOR

BACKGROUND OF THE INVENTION

1. Field of the Invention

This invention relates to a self-unloading bulk material truck and/or trailer beds having a discharge conveyor. More specifically, the invention relates to an improved chain bar for connecting the chains, and carrying the belt sections, of the discharge conveyor.

2. Related Art

Discharge conveyors have been developed to provide a self-unloading feature for bulk material beds, such as those provided on trailers or trucks for transport of potatoes, sugar beets, or garbage, for example. Bulk beds and conveyors of this general type are described in Eisenman U.S. Pat. No. 4,055,265 (issued Oct. 25, 1977), Eisenman U.S. Pat. No. 4,230,360 (issued Oct. 28, 1980), Gust U.S. Pat. No. 4,664,583 (issued May 12, 1987), Whitehead U.S. Pat. No. 4,741,431 (issued May 3, 1988), and Gust U.S. Pat. No. 5,102,285 (issued Apr. 7, 1992).

An example of a recent Eisenman self-unloading bed design, such as is available from Trinity Trailer, 8200 Eisenman Road, Boise, Id., 83716, is shown in FIGS. 1 and 2. This bed and its discharge conveyor have many similarities to those drawn in Eisenman U.S. Pat. Nos. 4,230,360, and 4,055,265. Referring to call-out numbers included in the present inventors' attached FIGS. 1 and 2, the trailer 10 is typically connected to a tractor (not shown) at the trailer front end 12. The bed front wall 14, upright rear wall 16, left and right side walls 18, 18' form a substantial portion of the bed, with the bottom floor being formed by an endless conveyor 20 system. The lower portions 22, 22' of side walls 18, 18' slant toward the middle, so that the bulk material tends to fall/slide down toward the conveyor 20. This way, as the endless conveyor moves along the bottom of the bed to carry material out of the opening 24 in the rear wall, the bulk material falls down to continuously "refill" the conveyor until the bed is empty.

A conveyor preferred by the inventors includes a chain system comprising two spaced-apart endless chains 26, 26' each in a loop that extends horizontally substantially all the length of the bed. See, for example, U.S. Pat. No. 4,055,265, which is incorporated herein by this reference. Chain bars 30 extend between the chains, at spaced intervals along, and perpendicular to, the lengths of the chains 26, 26' to connect the chains together and to provide an anchoring place for the belt flaps 40 of the conveyor. Driven by sprockets (see, for example, FIG. 5 of U.S. Pat. No. 4,055,265), the chains 26, 26' carry the chain bars 30 along a floor liner 32, which is generally horizontal, flat and smooth, Ultra High Molecular Weight (UHMW) polymer sheet. The belt portions 40 ride along with the chain bars 30, in effect, dragged along the UHMW floor liner carrying the bulk material in the bed. The belt portions 40 in the working (top) flight lie generally horizontally and overlap, to create a substantially continuous belt moving from the front to the rear of the bed. As the belt flaps 40 reach the opening 24 in the rear wall 16, they continue to be pulled by the chains, that is, down and underneath the floor liner 32 to travel in the opposite direction (toward the front of the bed). In doing so, the bulk material on each belt flap 40 is dumped out of the bed. As each flap 40 "turns the corner" to begin traveling underneath the floor liner, it may flip outward and downward, to at least temporarily leave contact with the adjacent (following) flap. Depending upon the design of the bottom side of the floor system and the undercarriage of the trailer, the belt flaps may then regain their overlapping contact with each other for part of the journey underneath the trailer. For example, as shown in FIG. 3B, the belt flaps 40 traveling underneath the floor liner and toward the front end stay close to each other and generally horizontal for several feet over the rear wheels. Then, when there is room (in this example, in front of the rear wheels) for the belt flaps 40' to fall down away from each other, the flaps 40' fall down away from each to hang down in a substantially vertical position. This way, the belt flaps 40, 40' tend to be self-cleaning. Once each belt flap 40' travels again to the front of the bed, it is pulled up again to the top, working flight, so that it again lies generally horizontally and overlapping the next (following) flap to carry bulk material toward the rear of the bed.

Conventional chain bars 30 are generally U-shaped, with a main body 50, and two legs 52, 52' depending from the body 50. Such conventional chain bars 30 may be seen in FIG. 5 of U.S. Pat. No. 4,055,265, called-out as number 35, and in FIG. 5 of this document.

Alternative chain bars are shown in Gust U.S. Pat. No. 4,664,583 (FIG. 4, call-out 37; see column 3, lines 38-44 and column 4, lines 39-45) and in Gust U.S. Pat. No. 5,102,285 (FIG. 4, call-out 37; see column 3, lines 38-44). The Gust chain bars have three portions and are generally Z-shaped in cross-section.

Still, there is a need for an improved conveyor system with improved chain bars, and the invention meets this need.

SUMMARY OF THE INVENTION

The present invention comprises a chain bar that has a profile which provides great strength while allowing the chain bar to be light weight. The profile also provides substantial bearing surfaces, for smooth and stable movement along the floor liner of a bulk material bed, while also maintaining easy access to the internal space of the chain bar for assembly of the conveyor system. The preferred profile includes all leading surfaces being rounded, and no sharp or small-radius surfaces being moves along the floor liner. The profile of the chain bar is preferably such that the chain bar may be made by simple and economical methods, for example, without welding. A single sheet of metal may be bent into the desired chain bar profile, holes and/or tabs may be provided for attachment to the chains and to the belt flaps, with little or no other machining or manipulation being needed.

An object of embodiments of the invention is to provide a strong bar that does not bind on the floor liner of a self-unloading bed, and, hence, reduces wear of the liner and also of the chain bar. Another object of embodiments of the invention is to provide a very light weight chain bar, with great strength, so that the overall weight of the conveyor system is reduced.

BRIEF DESCRIPTION OF THE DRAWINGS

FIG. 5 is a bottom perspective view of a conventional chain bar.

FIG. 6 is a bottom perspective view of the preferred embodiment of the invented chain bar.

DESCRIPTION OF THE PREFERRED EMBODIMENTS

Figure 1:
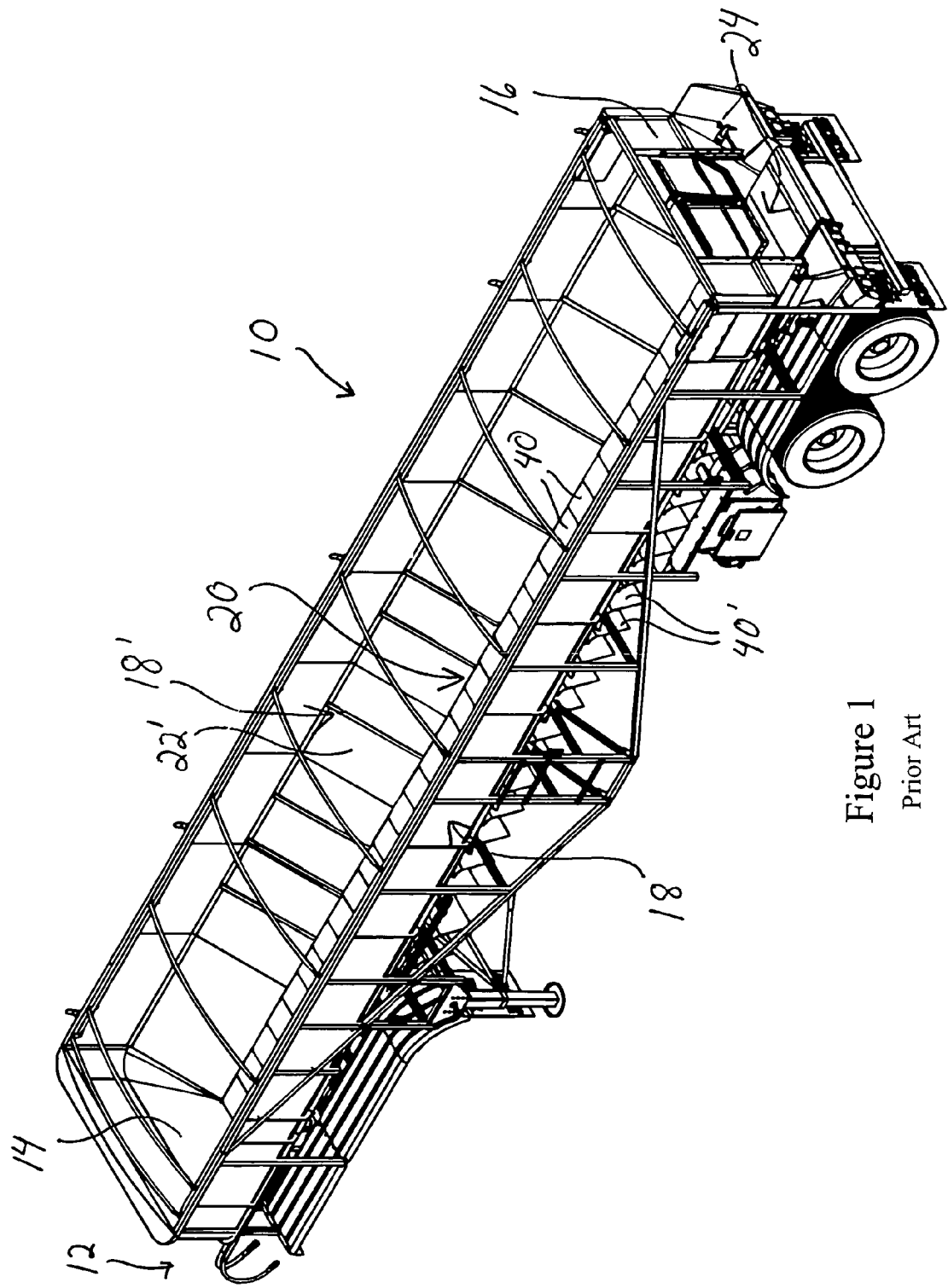
FIG. 1 is a rear perspective view of a prior art self-unloading bulk material trailer according to the prior art.
Figure 2:
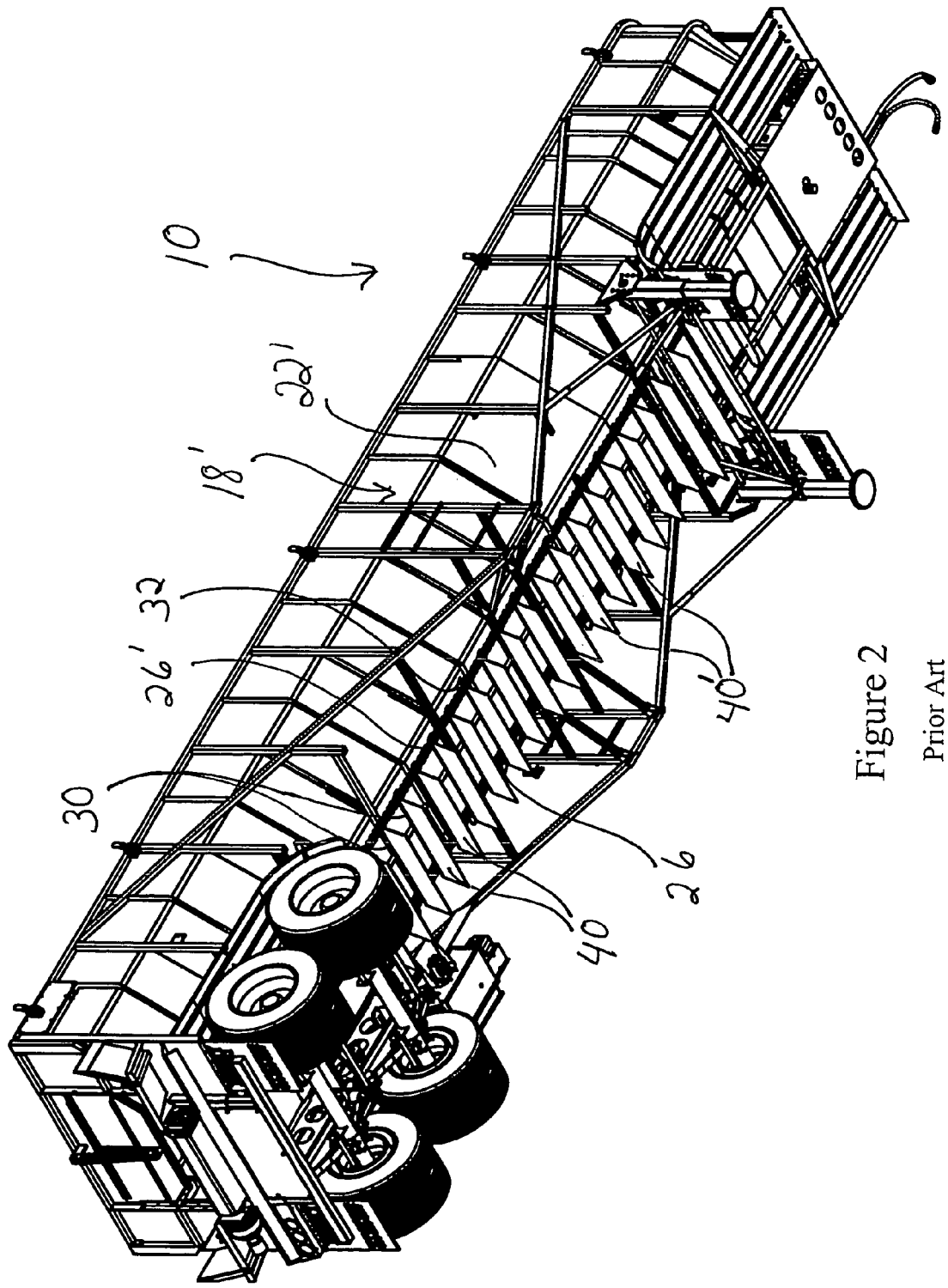
FIG. 2 is a bottom perspective view of the trailer of FIG. 1.
Figure 3A:
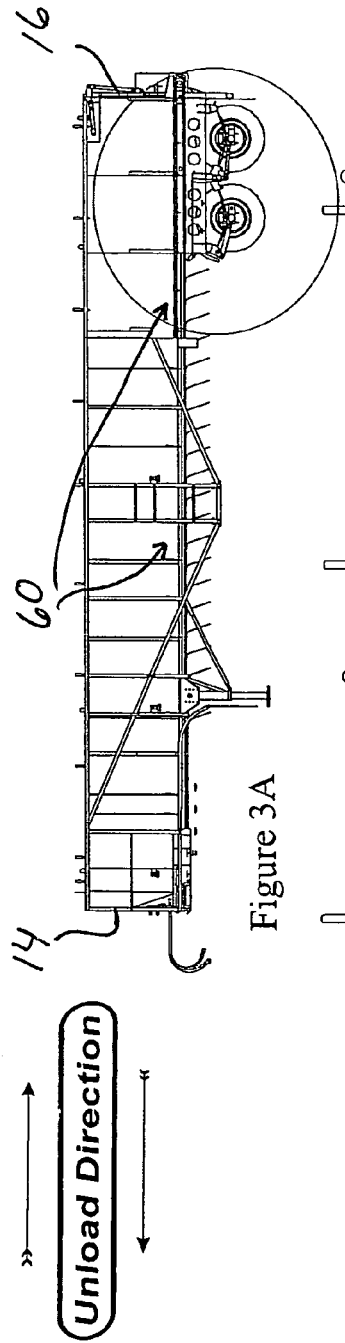
FIG. 3A is a side view of one embodiment of a trailer having a conveyor, said conveyor having one embodiment of the invented chain bar. A key at the left end of the FIG. 3A is included to illustrate the unload direction of the conveyors belts of FIGS. 3A and 3B.
Figure 3B:
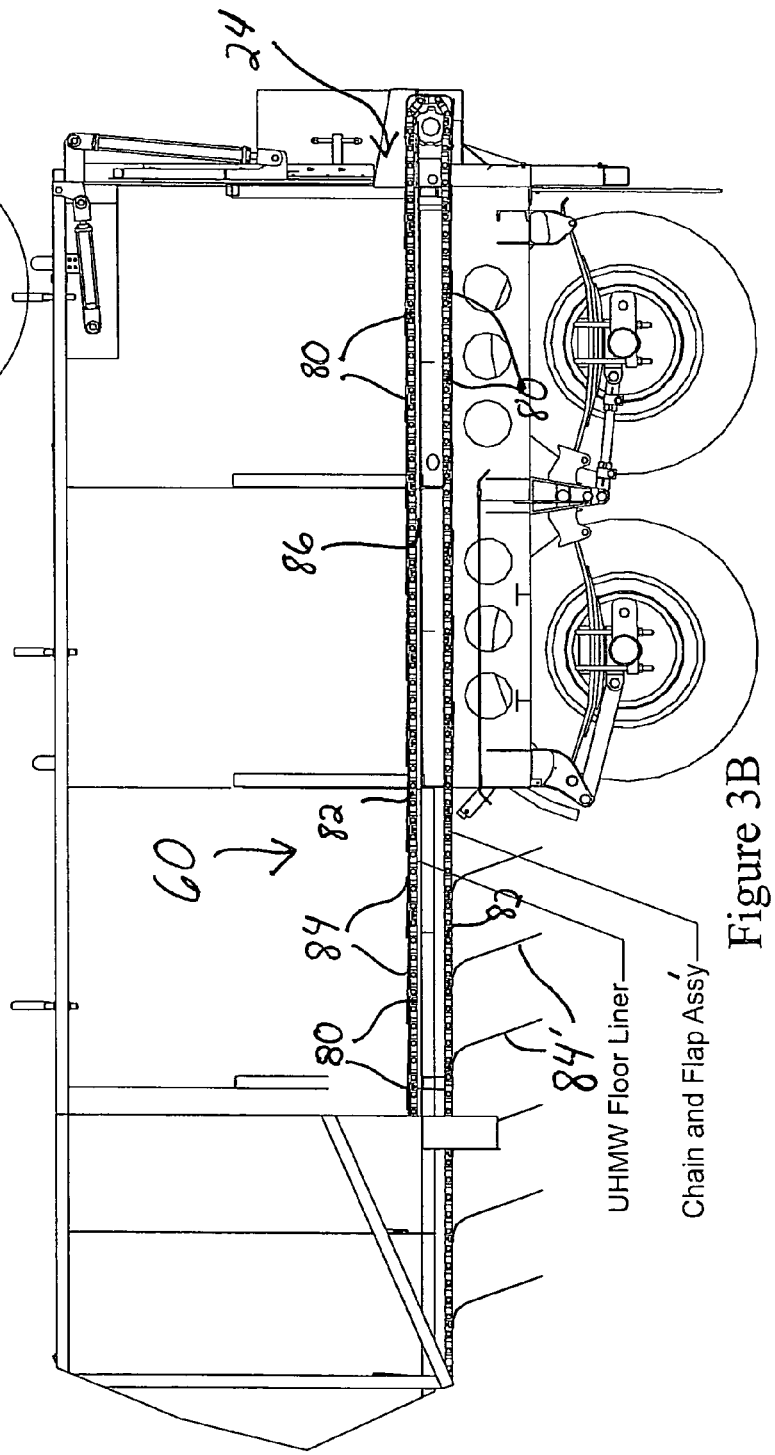
FIG. 3B is an enlarged detail of the trailer of FIG. 3A.
Figures 4A, 4B:
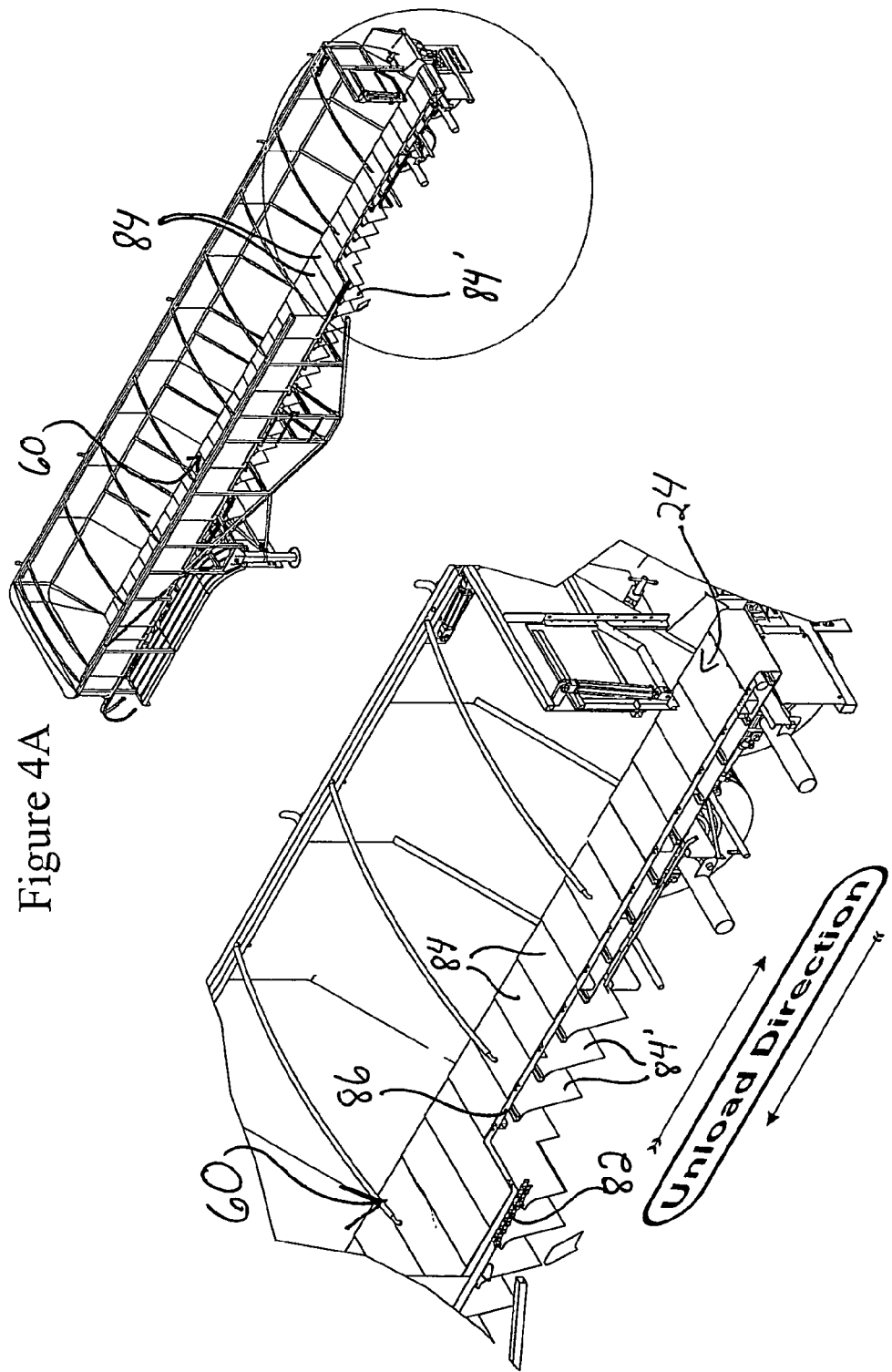
FIG. 4A is a perspective view of the trailer of FIGS. 3A and B, shown with a portion of the conveyor system cut away for better viewing of the details of the conveyor.
FIG. 4B is an enlarged detail of the view of FIG. 4B, with a key below the figure illustrating the unload direction of the conveyor of FIGS. 4A and B.

Referring to the figures, there is shown examples of a prior art bulk material trailer bed (FIGS. 1 and 2) and a conventional chain bar (FIG. 5) for a prior art conveyor. Also, the figures shown one, but not the only, embodiment of the invented improved chain bar for a bulk material trailer conveyor such as may be used in the illustrated trailer bed or other bulk material truck and trailer beds.

FIGS. 3A, 3B, 4A, and 4B illustrate a conventional trailer bed 10 that has been fitted with a conveyor 60 having the invented, improved chain bars 80. As may be seen in FIGS. 3A-4B, the conveyor 60 comprises chains 82 and belt flaps 84, 84' that may be constructed and may operate the same as those described above in the Related Arts section. The trailer in FIGS. 3A and 3B includes a UHMW floor liner 86, which also may be constructed and may operate the same as those described above in the Related Arts section. Alternative chain, belt, and liner structures may also be used, as alternative versions may also benefit from the strong, lightweight, and non-damaging chain bar 80 of embodiments of the invention. Likewise, alternative trailer bed designs may be used, or the invented chain bars may be used on self-unloading truck beds or other conveyors, for example.

FIG. 5 illustrates a conventional chain bar 30, with its generally U-shaped shape, as described above in the Related Art section. Note that legs 52,52' depend from the main body 50, so that this conventional chain bar has two longitudinal bends.

The preferred embodiment of the invented chain bar 80, on the other hand, includes a main body 90, and two legs 92, 92' that depend perpendicularly from the main body, so that the legs 92, 92' are preferably parallel to each other. At the outer edge of each of the legs 92, 92' is a foot 94, 94' that extends perpendicular to the legs 92,92' to be generally and preferably exactly, parallel to the plane of the main body 90. These feet 94,94' extend the same direction, that is, generally toward the left edge of the paper in FIG. 6. Thus, one may note that the chain bar 80 has a total of four bends all along its length. The length of legs 92,92' are preferably the same, placing the feet 94, 94' on the same plane all along the length of the chain bar 80. Each of the main body 90, legs 92, 92', and feet 94, 94' are preferably flat, planar members, created by bending of a single sheet or "rolled bar" of metal or other strong, rigid material. The holes 98 in the main body may also be easily made for connection to the chains and to the belt flaps 84, 84'. Conventional metal bar rolling and bending, and hole drilling, equipment and may be used, and no cutting (except to cut the bar into the desired chain bar lengths, if necessary), no welding, or other fabrication is needed.

Figure 7:
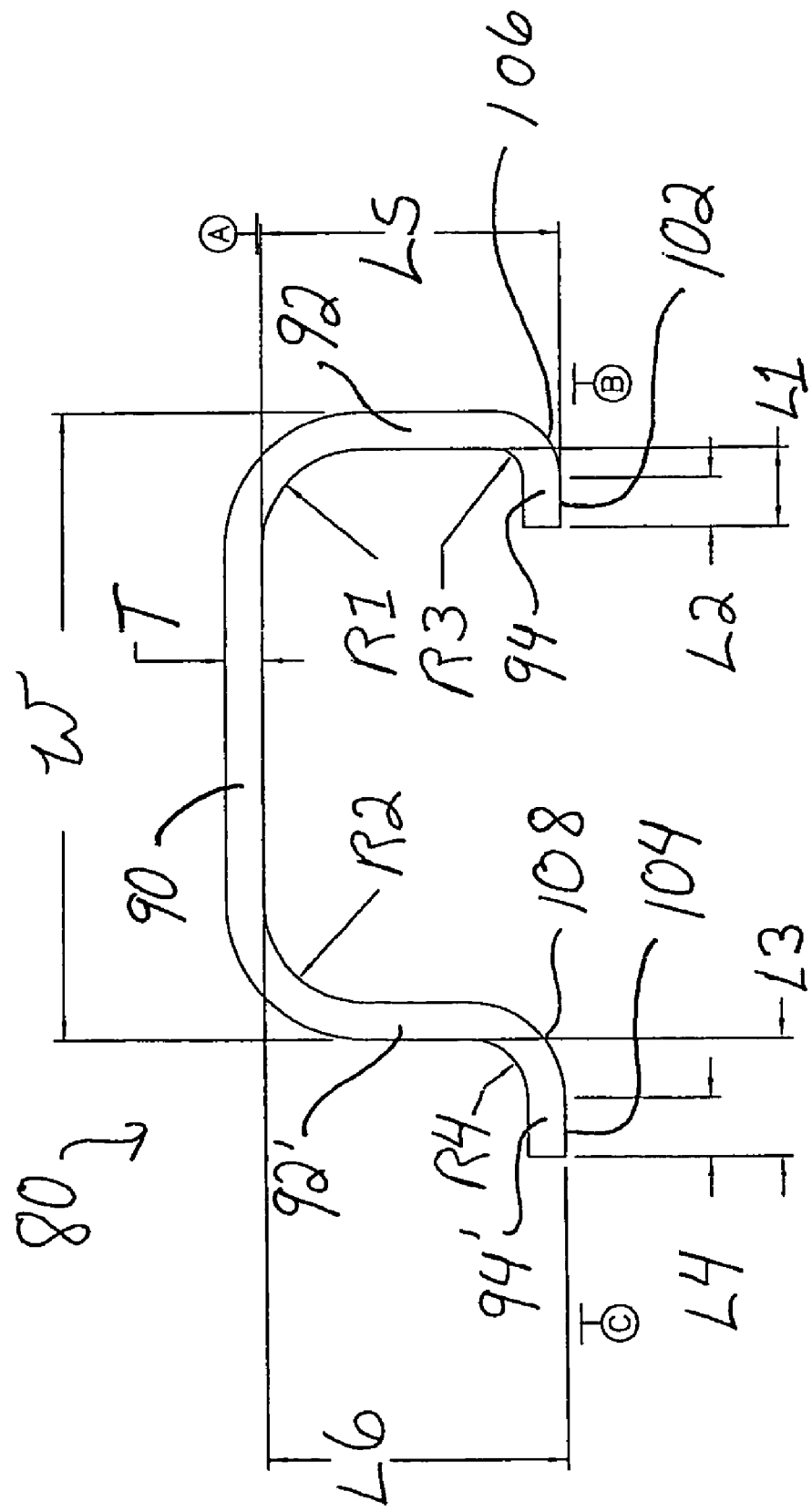
FIG. 7 is an end profile of the chain bar of FIGS. 3A, 3B, 4A, 4B, and 6.

The profile of the preferred chain bar is shown to best advantage in FIG. 7. The entire, or substantially the entire, weight of the bed load and conveyor rest on the chain bars as they slide along the floor liner 86, but the feet 94, 94' provide broad, flat bearing surfaces 102, 104, for easy, smooth, and undamaging sliding of the chain bars on the liner 86. The feet 94, 94' are relatively broad and flat compared to the lower end surfaces of the conventional legs 52, 52' and more easily slide along the liner, which may have the benefit of lower energy requirement to move the conveyor and longer lives of liner and chain bars. Not only do the broad, flat bearing surfaces 102, 104 slide along the floor liner 86 more easily than conventional chain bars, the transitions from legs 92, 92' to feet 94, 94' creates leading surfaces 106, 108 that are curved and smooth. As movement of the chain bars 80 is to the right in FIG. 7, these leading surfaces 106, 108 a very unlikely to bind on, gouge into, or otherwise cause damage to the floor liner 86. Although the chain bars 80 are very unlikely to bend during use, as discussed below, any bending or flexing of the chain bars 80 would be very unlikely to position the feet 94, 94' or leading surfaces 106, 108 in an orientation that could cause any gouging of the chain bar 80 into the liner 86.

The preferred dimensions of the chain bar for a conventional trailer bed conveyor are as follows:

Bar thickness (T): 0.118 inches

Main body width (W): 2 inches

Radius of bend between main body and leading leg (R1): 0.313 inches

Radius of bend between main body and trailing leg (R2): 0.312 inches

Radius of bend between leading leg and leading foot (R3): 0.094 inches

Radius of bend between trailing leg and trailing foot (R4): 0.156 inches

Length of leading foot (L1): 0.25 inches

Length of leading foot wherein the foot is planar (after bend) (L2): 0.156 inches Length of trailing foot (L3): 0.375 inches Length of trailing foot wherein the foot is planar (after bend) (L4): 0.188 inches Length of legs including foot thickness (L5, L6): 0.938 inches Further, there should be no charge edges on the feet. Feet are preferably parallel to the main body, and the legs are parallel to each other and perpendicular to the main body and feet, with preferred tolerance in the angle of the bends being plus/minus 1 degree.

The preferred material for the chain bars 80 is Domex® 100 XF AS Rolled Extra High Strength Cold Forming Steel, which is available from SSAB Swedish Steel, Pittsburgh, Pa. Another preferred material is Domex® 110 XF AS Rolled Extra High Strength Cold Forming Steel, which is also available from SSAB Swedish Steel, Pittsburgh, Pa. and which is reported by Swedish Steel to conform to European Standard EN 10149-2 Grade S7000MC. These steels have been determined by the inventors to produce a chain bar 80 that may be easily and accurately bent into an extremely strong chain bar 80, wherein the resulting chain bar is lighter in weight than a conventional chain bar of the type shown in FIG. 5. The weight of a 12 inch long chain bar of the above-described Domex® 100 XF or Domex® 110 XF materials and generally with the above dimensions is approximately 1.62 pounds. These Domex® steels are reported by SSAB Swedish Steel to have yield strength Ksi of 100-110 (minimum), tensile strength Ksi of 110 (minimum), elongation (2") of 15% (minimum), Rockwell hardness $H_B$ of approximately 250-260, Rockwell hardness $H_C 20$, and impact toughness of 20 ft. lbs at −40 degrees F.

Figure 8:
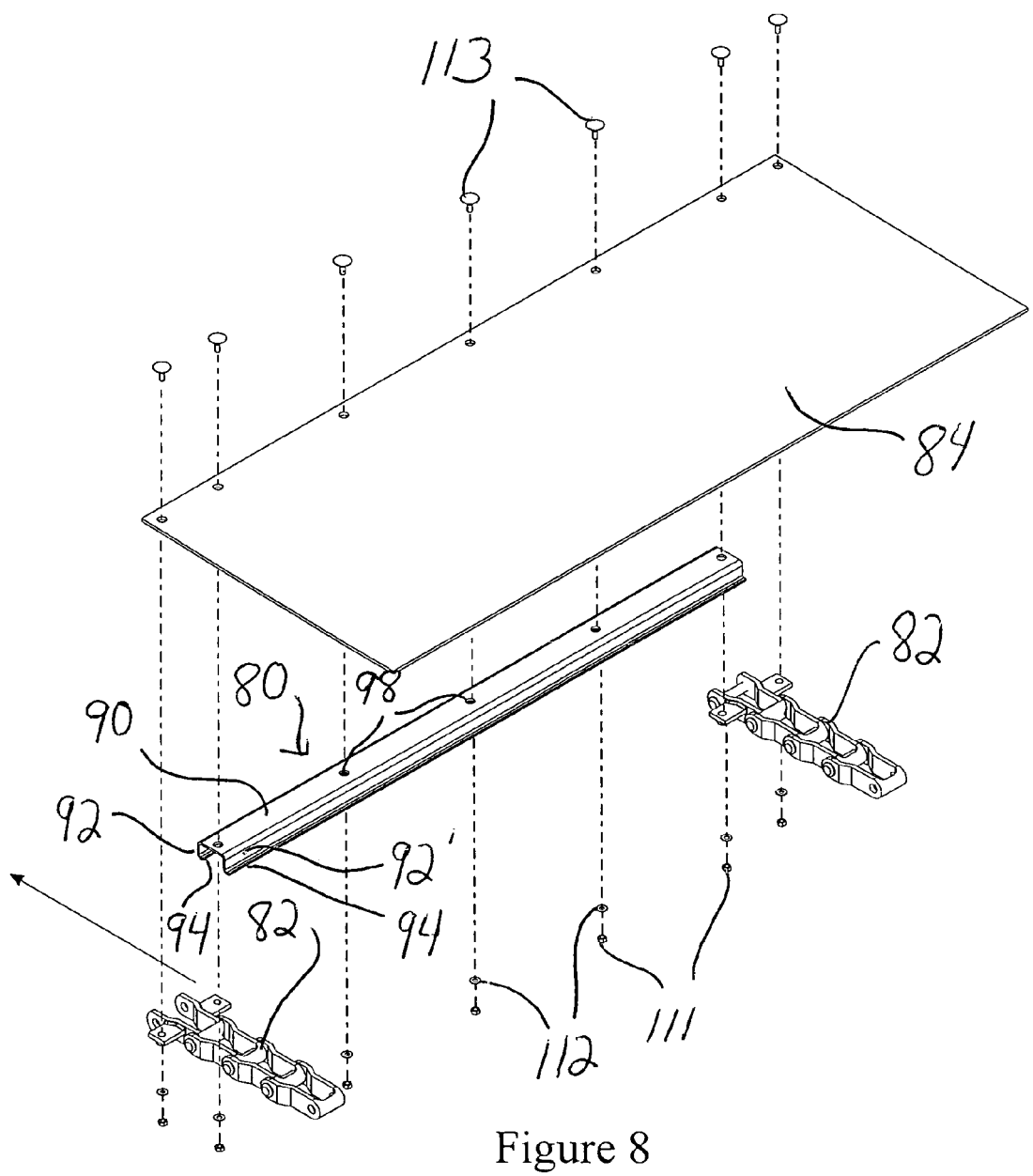
FIG. 8 is an exploded view of a belt flap, chain bar, and chain assembly, using the chain bar of FIGS. 3A, 3B, 4A, 4B, 6 and 7.

FIG. 8 is an exploded detail of how a flap 84 may attached to a chain bar 80 and to the chains 82 by means of nuts 111, washers 112, and bolts 113, or other fasteners.

Therefore, it may be said that a conveyor according to some embodiments of the invention is for a self-unloading bulk material bed and comprises: two chains generally parallel to each other and adapted to be moveable in an unloading direction; a chain bar extending between, and connected to, portions of said two chains, the chain bar having a main body, two legs extending from said main body, and a foot extending from each leg, said foot of each leg extending away from the unloading direction; a floor on which each foot of the chain rests and slides relative to the floor in said unloading direction; and a belt flap connected to said chain bar and adapted to lie generally parallel to said floor for carrying bulk material in the unloading direction to exit the bed. Typically, but not necessarily, the unload direction is toward the rear of the trailer/bed. Preferably, the two legs are connected to opposing outer longitudinal edges of the main body, so that, in the preferred embodiment shown in the drawings, the two legs are about 2 inches (1.5-3 inches preferred range) apart. Examples of bend radii are as follows: each leg may be connected to the main body by a bend being curved on a radius of 0.2-0.4 inches; and each foot is connected to its respective leg by a bend being curved on a radius of 0.05-0.3 inches. Typically, the chain bar is generally a U-shaped with a foot on each leg of the "U" wherein each foot extends away from the direction of travel (in other words, the feet bend away from the direction of travel). Preferably, the two feet extend only away from the direction of travel and there is no foot, extension, or other protrusion extending forward (toward the direction of travel) from the legs (and especially none extending forward from the distal ends, or from the distal half of either leg). Thus, it may be said that the preferred chain bar consists only of a main body, two legs extending from said main body, and a foot extending from each leg, said foot of each leg extending away from the unloading direction.

The preferred "endless" chains are each formed in a loop, so they may rotate around. The top portion of the chains (resting and sliding above the floor liner) are moving toward the unloading opening of the bed, and, hence, in an unloading direction (typically, but not necessarily the rear of the bed). The bottom portion of the chains are below the floor liner and do not necessarily touch the floor liner. The bottom chain portions "complete the cycle" by moving in the direction opposite to the top portions. The conveyor preferably is a "self-cleaning" conveyor, wherein the belt flaps hang down generally vertically during at least a part of the flap's journey away from the unloading end of the trailer/bed. Thus, residual bulk material (residual, that is, after most of the bulk material has fallen off at the unloading opening) tends to fall off the flaps approximately as they reach generally vertical underneath the floor liner.

The floor upon which the chain bars slide is typically, but not necessarily, the elongated floor extending between the front and rear walls of an elongated trailer bed. The floor may be various materials, but preferably is an ultra high molecular weight (UHMW) polymer "liner" plate. Embodiments of the invention may comprise any length of preferably-endless chains, and any number of chain bars and flaps, as these features will typically be a design choice based on the length of the trailer/bed and the weight of material expected to be loaded into, and unloaded from, the trailer/bed. Typically, the endless chains loops are 85-106 feet long (so that an "endless" conveyor belt installed as a "flattened loop" is about half that long from its front near the bulk material bed front to its rear near the rear of the bed). The chain bars are spaced approximately 13.8 inches apart along the length of the chain loops. Conveyor belt widths also vary depending on the bed dimensions and design, and whether the conveyor belt is a two-chain model or a three-chain model. Examples of belt widths (and therefore belt flap widths) and chain bar lengths for two-chain models chain bars are as follows (wherein the belt "width" is the belt's dimension transverse to the length of the bed, and the chain bar "length" is the bar's dimension transverse to the length of the bed): 50⅛ inch long chain bar for 61 inch wide belt; 37 inch long chain bar for 48 inch wide belt; 30⅛ inch long chain bar for 41 inch wide belt; 23¾ inch long chain bar for 36 inch wide belt; 21⅛ inch long chain bar for 31 inch wide belt; and 13⅛ inch long chain bar for 25 inch wide belt. The belt flaps are typically rectangular, having the above widths and being about 18 inches long (in the direction parallel to the length of the bed) so that they overlap each other by about 4-5 inches when attached to the 13.8-inch-spaced chain bars.

Some embodiments of the invention may comprise the invented chain bar and conveyor in combination with the bulk material bed itself, and one of skill in the art will be able to construct and use such a bulk material bed after viewing this Description and the attached drawings, and viewing bulk material bed patent literature. The invention is not necessarily limited to being used with a particular size or style of bulk material bed, size or style of belt or belt flaps, or a particular number or style of chains.

Although this invention has been described above with reference to particular means, materials and embodiments, it is to be understood that the invention is not limited to these disclosed particulars, but extends instead to all equivalents within the broad scope of the following claims.

We claim:

1. A conveyor for a self-unloading bulk material bed, the conveyor comprising:
    two chains generally parallel to each other and adapted to be moved in an unloading direction;
    a chain bar extending between, and connected to, portions of said two chains, the chain bar having a main body, two legs extending from said main body, and a foot extending from each leg, said foot of each leg extending away from the unloading direction;
    a floor on which each foot of the chain rests and slides relative to the floor in said unloading direction; and
    a belt flap connected to said chain bar and adapted to lie generally parallel to said floor for carrying bulk material in the unloading direction to exit the bed.

2. A conveyor as in claim 1, wherein the two legs are connected to opposing outer longitudinal edges of the main body.

3. A conveyor as in claim 1, wherein each foot is connected to its respective leg by a bend being curved on a radius of 0.05-0.3 inches.

4. A conveyor as in claim 1, wherein each leg is connected to the main body by a bend being curved on a radius of 0.2-0.4 inches.

5. A conveyor as in claim 1, wherein said legs are parallel to each other.

6. A conveyor as in claim 5, wherein said legs are generally perpendicular to the main body.

7. A conveyor as in claim 1, wherein said floor is an ultra high molecular weight (UHMW) polymer plate.

8. A conveyor as in claim 1, wherein said chains are endless chains.

9. A conveyor as in claim 8, further comprising a plurality of said chain bars extending between, and connected to, portions of said two chains, each of said plurality of chain bars having a main body, two legs extending from said main body, and a foot extending from each leg, said foot of each leg extending away from the unloading direction; and a plurality of belt flaps, wherein one of said plurality of belt flaps is connected to each of said chain bars and adapted to lie generally parallel to said floor for carrying bulk material in the unloading direction to exit the bed.

10. A conveyor as in claim 9, wherein an upper portion of said endless chains move above and across said floor in the unload direction and a lower portion of said endless chains move below said floor in a direction opposite the unload direction.

* * * * *

UNITED STATES PATENT AND TRADEMARK OFFICE
CERTIFICATE OF CORRECTION

PATENT NO. : 7,597,191 B2  Page 1 of 1
APPLICATION NO. : 11/417583
DATED : October 6, 2009
INVENTOR(S) : Eisenman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 745 days.

Signed and Sealed this

Twenty-eighth Day of September, 2010

David J. Kappos
*Director of the United States Patent and Trademark Office*